Jan. 30, 1934.  F. I. KLAYMAN ET AL  1,945,296
APPARATUS FOR CLEANING AND STERILIZING FEATHERS
Filed May 29, 1933  3 Sheets-Sheet 1

Inventors.
Frank I. Klayman
Frederick R. Lawrence
by *Heard Smith & Tennant*
Attys.

Jan. 30, 1934.  F. I. KLAYMAN ET AL  1,945,296
APPARATUS FOR CLEANING AND STERILIZING FEATHERS
Filed May 29, 1933   3 Sheets-Sheet 2

Inventors.
Frank I. Klayman
Frederick R. Lawrence
by Heard Smith & Tennant
Attys.

Jan. 30, 1934.  F. I. KLAYMAN ET AL  1,945,296
APPARATUS FOR CLEANING AND STERILIZING FEATHERS
Filed May 29, 1933   3 Sheets-Sheet 3

Inventors.
Frank I. Klayman
Frederick R. Lawrence
by Heard Smith & Tennant
Attys.

Patented Jan. 30, 1934

1,945,296

UNITED STATES PATENT OFFICE 1,945,296

APPPARATUS FOR CLEANING AND STERILIZING FEATHERS

Frank I. Klayman, Newton, and Frederick R. Lawrence, Roxbury, Mass.; said Klayman assignor to Louis Gordon, Chelsea, Mass.

Application May 29, 1933. Serial No. 673,330

6 Claims. (Cl. 34—44)

This invention relates to an apparatus for cleaning, steaming, sterilizing and fluffing feathers and has for one of its objects to provide a novel apparatus by which different batches of feathers can be subjected separately to the cleaning, steaming, sterilizing and fluffing operations in rapid succession and each individual batch can be returned to its own container.

Another object of the invention is to provide a novel apparatus in which each batch of feathers progresses independently through the beating, steaming, sterilizing and other operations and in which separate batches of feathers can be operated on simultaneously, one batch of feathers being subjected to one of the various operations while other batches of feathers are being simultaneously subjected to other operations.

In order to give an understanding of the invention we have illustrated in the drawings a selected embodiment thereof which will now be described after which the novel features will be pointed out in the appended claims.

Figure 1:
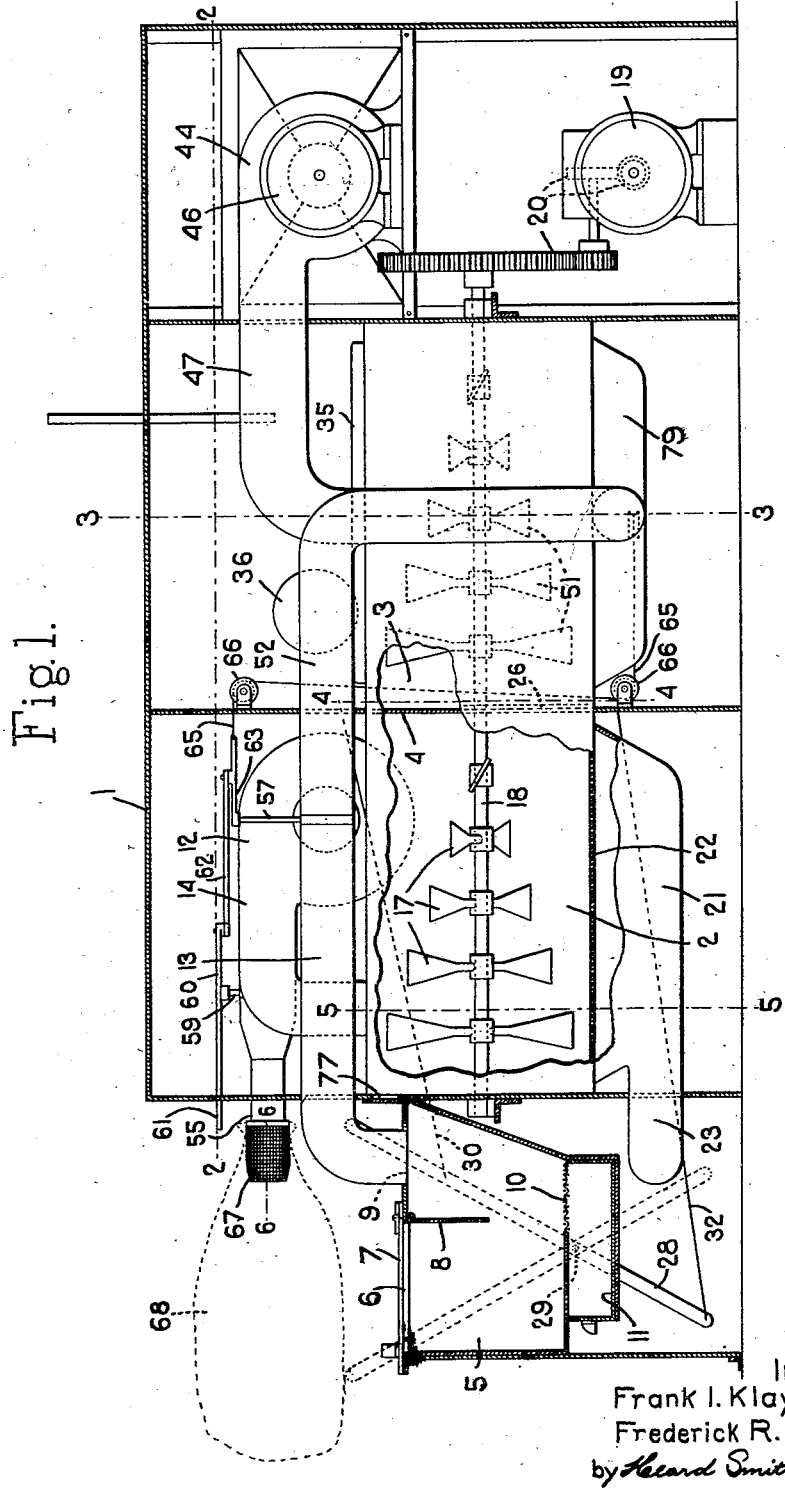
Fig. 1 is a vertical longitudinal section through an apparatus embodying our invention.

An apparatus embodying our invention comprises a casing having a dusting chamber in which the dust is removed from the feathers and a sterilizing chamber in which the feathers are steamed, sterilized and dried, together with means for moving a batch of feathers through said chambers successively and then delivering the sterilized and dried feathers to a bag or other container.

The apparatus is designed for treating different batches of feathers independently. Each batch of feathers may be those contained in an individual pillow, for example, and in such case the feathers from any pillow will be carried through the cleaning, steaming and sterilizing operations as a unit and independently from the feathers of any other batch.

With this apparatus, therefore, it is possible to take the feathers from a pillow and carry them as a unit through the cleaning, steaming, sterilizing and other operations and return the same feathers back to the ticking of the pillow again.

In the drawings 1 indicates a casing which may be made of any suitable material and which is divided to form a dusting chamber 2 and a sterilizing chamber 3, said chambers being separated by a partition 4. The casing is also provided with a receiving chamber 5 into which the batch of feathers are initially deposited. This chamber 5 is constructed so that any heavy foreign matter, such as sand or the like, which may be mixed with the feathers of the batch will be separated from the feathers. From the receiving chamber 5 the batch of feathers is transferred to the dusting chamber 2 wherein they are beaten and agitated to free them from dust, suitable means being provided for removing the dust from the chamber.

After this dusting operation the batch of feathers as a unit is transferred to the sterilizing chamber in which they are steamed, sterilized and dried. After the steaming, sterilizing and drying operations have been completed the batch of feathers is transferred as a unit from the sterilizing chamber to any container or receptacle. While the sterilizing of the batch of feathers is being accomplished in the sterilizing chamber 3 a second batch of feathers may be admitted to the dusting chamber 2 and subjected to the beating or dusting operation, said batch of feathers being transferred to the sterilizing chamber after the sterilizing and drying of the first batch of feathers has been completed and said first batch has been transferred from the sterilizing chamber to a container.

The receiving chamber 5 is shown as having an opening 6 in its upper end which is closed by a door or closure 7. Said receiving chamber is also formed with a vertically-arranged baffle plate 8 and with an egress opening 9 at its top on the opposite side of the baffle plate from the entrance opening 6 and through which egress opening the feathers are delivered to the dusting chamber 2. The means for effecting the transfer of the feathers will be presently described.

The bottom of the receiving chamber 5 is in the nature of a screen 10 and below the screen 10 is a drawer 11.

When any batch of feathers is deposited in the receiving chamber 5 they will pass downwardly around the baffle plate 8, then up to the egress opening 9 and during this passage the heavy foreign material, such as sand, etc., will gravitate to the bottom of the receiving chamber 5 and will pass through the screen 10 into the drawer 11.

As stated above the feathers of each batch are transferred as a unit from the receiving chamber 5 to the dusting chamber 2 and means are provided for agitating or beating the feathers while in the dusting chamber to remove dust therefrom.

The transfer of the feathers from the receiving chamber 5 to the dusting chamber 2 is accomplished through a blower 12, the inlet of which is connected by a pipe connection 13 to the egress opening 9. The discharge of the blower is connected by a pipe connection 14 to an inlet opening 15 in the top of the dusting chamber 2. The blower is operated in any suitable way as by means of a motor 16. When the blower is operating the suction produced in the inlet pipe 13 will draw the feathers from the receiving chamber 5 and these feathers will be blown into the dusting chamber 2 through the inlet opening 15. As stated above, during the passage of the feathers around the baffle plate 8 in the receiving chamber the heavy foreign matter will collect in the bottom of the receiving chamber and pass through the screen 10 into the drawer 11.

Suitable means are provided for beating and cleaning the feathers of dust in the dusting chamber. For this purpose we have provided a beating device which serves to keep the feathers agitated. Such device comprises a plurality of blades 17 carried by a shaft 18, said blades being arranged radially of the shaft and at different angles. The shaft 18 is operated by a suitable motor 19 through appropriate reducing gearing 20.

The blower 12 is also made use of to remove the dust from the dusting chamber 2. Said chamber 2 is shown as having an opening 21 at its lower side which is covered with a screen 22 to prevent feathers from passing into said opening. This opening communicates with a dust discharge pipe or conduit 23 to the end of which may be secured a dust-receiving bag 24. The blower 12 will be actuated not only for the purpose of transferring the batch of feathers as a unit from the receiving chamber 5 into the dusting chamber 2 but will also be operated during the dusting process. This blower builds up a pressure in the dusting chamber and causes a current of air to flow out through the opening 21 and the dust discharge pipe 23 into the bag 24. Thus the dust is blown out through the opening 21 and conduit 23 and is collected in the dust bag 24. The feathers, however, are retained in the dusting compartment because of the presence of the screen 22 and while they are thus retained they are continually being agitated by the blades 17.

The dust bag 24 is shown as received in a suitable chamber or compartment within the casing 1 situated at one side of the dusting chamber 2. The end 91 of the pipe 23 to which the bag 24 is connected may be swivelled to the transverse portion so as to permit said end to be swung to the left, Fig. 2, into a position in which it will be convenient for the operator to attach the bag 24 to or remove it from said end 91 of the pipe. This may be done through an opening formed in the end of the casing.

As stated above after the batch of feathers has been beaten and dusted in the dusting chamber 2 said batch is transferred as a unit into the sterilizing chamber 3 where the feathers are steamed to sterilize them and dried and fluffed up.

The transfer is effected through an opening 25 in the partition 4. This opening 25 is normally closed by a gate, but when the gate is opened a communication is established between the two chambers through which the feathers are transferred. The gate is shown as a two-part structure comprising the two sections 26 which are pivotally mounted on the shaft 18.

Figure 4:
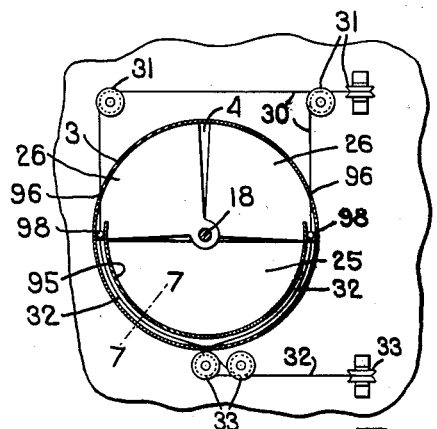
Fig. 4 is a section on substantially the line 4—4, Fig. 1.
Figure 5:
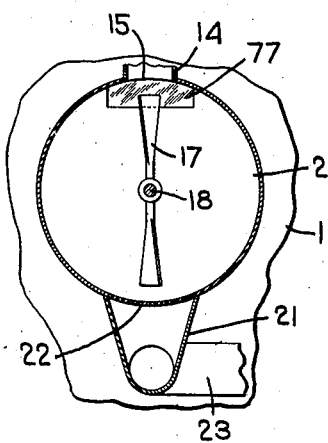
Fig. 5 is a section on the line 5—5, Fig. 1.
Figures 6, 7:
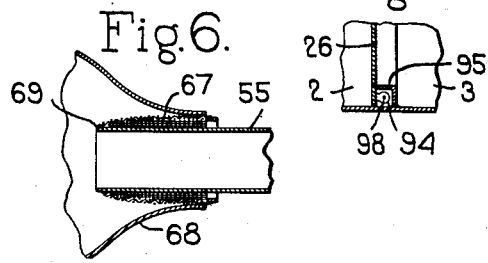
Fig. 6 is a section on the line 6—6, Fig. 1.
Fig. 7 is a section on the line 7—7, Fig. 4.

Any suitable means for opening and closing the gate may be employed. As herein shown we have provided a lever 28 pivoted at 29. One end of the lever is connected by two flexible connections 30 to the two gate sections 26, said flexible connections passing around suitable direction pulleys 31 and passing through openings in the wall of the sterilizing chamber 3 at points indicated at 96 in Fig. 4, said connections being connected to projections 98 carried by the gate sections. The wall of the sterilizing chamber 3 is shown as having an angle iron guide member 95 secured thereto which forms a passage 94 in which the projections 98 operate as the gate sections are opened and closed. This angle iron member 95 also serves as a guide for the portions of the flexible connections 30 between the projections 98 and the points 96 when the gates are being opened and closed.

The other end of the lever 28 is also connected to the gate sections at 98 by two other flexible connections 32 which pass around suitable direction pulleys 33. When the lever 28 is swung in one direction a pulling strain will be applied to the flexible connections 30 which will serve to open the gate. This same movement of the lever gives up sufficient slack in the flexible connections 32 to permit the opening movement of the gate. When the lever is swung in the opposite direction a pulling strain is applied to the flexible connection 32 by which the gate sections are closed together thereby to close the opening 25 and this reverse movement gives up slack in the connections 30 as the gate is closed.

The transfer of the batch of feathers as a unit from the dusting chamber 2 to the sterilizing chamber 3 through the opening 25 is preferably accomplished through the medium of the blower 12.

The sterilizing chamber 3 is provided with a port or opening in its upper side which is provided with a screen 34 and which leads into a hood 35 to which is connected a pipe or conduit 36 that is open to the atmosphere. When the gate sections 26 are opened the pressure developed in the dusting chamber 2 by the blower 12 will cause a current of air to flow from the dusting chamber to the sterilizing chamber through the opening 25 and out through the pipe 36 and this current of air carries with it the feathers in the dusting chamber so that the operation of opening the gate sections 26 serves to rapidly transfer the batch of feathers as a unit from the dusting chamber to the sterilizing chamber. After the feathers have been transferred from the dusting chamber 2 to the sterilizing chamber 3 the gate sections 26 are closed and the operation of steaming, sterilizing, drying and fluffing the batch of feathers in the sterilizing chamber 3 is then carried out.

The steaming of the feathers in the chamber 3 is accomplished by admitting a suitable quantity of live steam to said chamber. The presence of the live steam not only steams the feathers but also has a sterilizing effect on them. Heated air is also delivered to the chamber 3 and the effect of the heated air is to dry and fluff up the feathers and also to assist in the sterilization of them. The feathers are thus reconditioned and given new life.

The steam is introduced into the sterilizing chamber through a plurality of steam jets 37 which are supplied with steam through a steam pipe 38, the latter having a valve 39 therein. This valve may be operated or controlled in any approved way. As herein shown it is normally closed but is opened by the turning of a bell crank lever 40 pivoted to the valve casing at 41. One arm of the bell crank lever is connected to a pull connection 42 having a ring 43 at the end thereof so when the operator draws on the ring 43 the valve will be opened to admit steam to the sterilizing chamber.

The heated air for drying and fluffing the feathers is supplied to the sterilizing chamber through the medium of a blower 44. This blower is operated in any suitable way as by means of a motor 46 and the discharge of said blower is connected by a conduit 47 to a hood 48 that extends along the side of the sterilizing chamber and communicates therewith through an opening 49. The air delivered by the blower 44 is heated by a heater 45 which may be in the form of steam coils or any other suitable air-heating device and which is situated adjacent the inlet of the blower. When the blower is operating air is drawn through the opening 50 in the casing and over the steam coils 45 and then is blown into the sterilizing chamber through the connection 47. During this operation there will be a continual current of heated air passing into the sterilizing chamber through the pipe 47 and out from said chamber through the discharge pipe 36. Means are also provided for beating or agitating the feathers while they are being steamed, sterilized and dried, and for this purpose the shaft 18 extends through the sterilizing chamber and is provided with blades 51 similar to the blades 17.

After the feathers have been properly steamed to sterilize them and dried the batch of feathers as a unit is withdrawn from the sterilizing chamber 3 and delivered into a suitable container. For this operation we propose to make use of the blower 12. The inlet of the blower is connected by a branch pipe 52 to an egress port 53 leading to a hood 79 that opens into the sterilizing chamber. This port 53 is normally closed by a valve or gate 54.

The discharge of the blower 12 is provided with a branch connection 55 through which feathers may be delivered into a bag or other container. A valve 56 pivotally mounted at 57 serves to close either one of the inlet pipe connections 13 or 52 leading to the blower 12, depending upon the position of said valve. Another valve 58 pivoted at 59 serves to close either of the discharge connections 14 or 55 of the blower 12.

Means are provided for operating these valves so as to close the discharge connection 55 and the inlet connection 52 during the time that the blower 12 is being used to transfer feathers from the receiving chamber 5 to the dusting chamber 2 and during the time that the feathers are being dusted and also during the time that the feathers are being transferred from the dusting chamber to the sterilizing chamber. When the feathers are to be removed from the sterilizing chamber and transferred to a bag or other container the valves 56 and 58 are shifted into a position to close the inlet pipe connection 13 and the discharge pipe connection 14 of the blower 12 and when the valves are thus adjusted the operation of the blower will produce a suction in the inlet connection 52 and will deliver into the discharge connection 55.

The valves 56 and 58 are preferably connected so as to be operated in unison and by a common operating mechanism.

Figure 2:
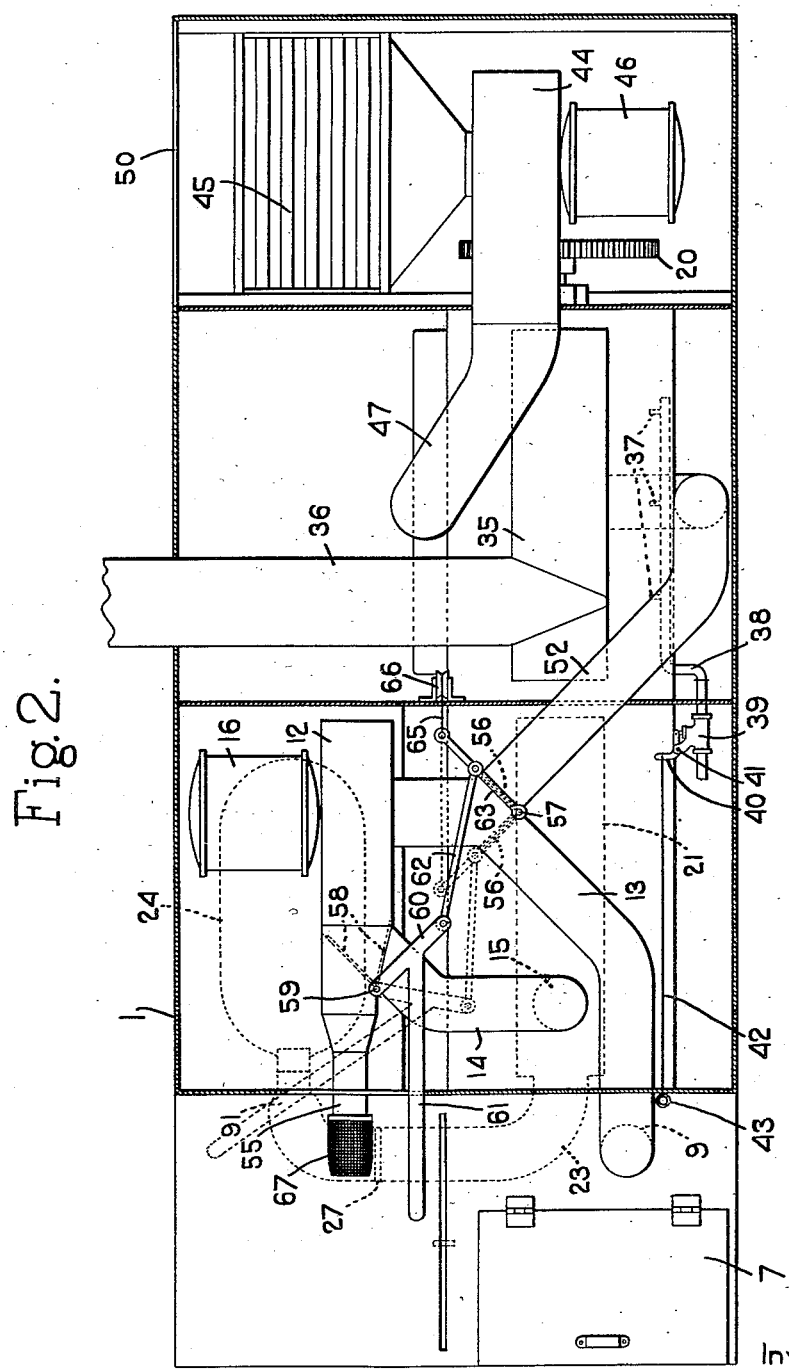
Fig. 2 is a horizontal section on substantially the line 2—2, Fig. 1.
Figure 3:
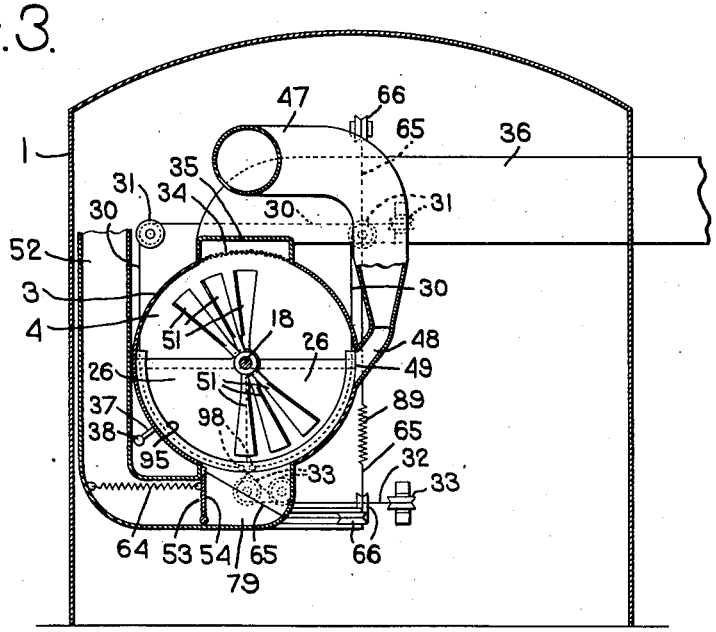
Fig. 3 is a section on substantially the line 3—3, Fig. 1.

The shaft 59 of the valve 58 has an arm 60 fast thereon from which extends a handle 61 so that by swinging the handle 61 from the full to the dotted line position in Fig. 2 the valve 58 will be shifted from the position in which it closes the discharge connection 55 into a position to close the discharge connection 14. The arm 60 is connected by a link 62 to an arm 63 rigid with the shaft 57 of the valve 56 so that the swinging movement of the handle 61 not only manipulates the valve 58 but also manipulates the valve 56. The movement of the handle 61 from the full to the dotted line position will thus close the discharge connection 14 and open the discharge connection 55 and will close the inlet connection 13 and open the inlet connection 52.

Means are provided whereby this shifting movement of the handle 61 from the full to the dotted line position also serves to open the discharge valve 54. Said valve is normally held in closed position by the spring 64 and said valve is connected by a flexible connection 65 to the lever 63, said connection passing around suitable direction pulleys 66. The swinging of the arm 63 from the full to the dotted line position Fig. 2 thus applies a pulling strain on the flexible connection 65 which serves to open the valve 54 against the operation of the spring 64. With the valves set in the position when the handle 61 is in dotted line position Fig. 2 the operation of the blower 12 will create suction in the sterilizing chamber which will draw the feathers through the inlet pipe 52 and discharge them through the discharge connection 55. A bag or other suitable container 68 may be secured to the end of the discharge connection 55 into which the feathers are deposited.

The discharge connection 55 is shown as having a cylindrical screen 67 surrounding it to which the open end of the bag 68 is secured. This cylindrical section 67 is somewhat larger than the discharge connection 55 so that a space exists between said screen and the discharge connection. This space, however, is closed at the end of the discharge connection as shown at 69. When the blower 12 is operating with the discharge connection 55 open the feathers will be blown into the bag 68 and the air which is moved by the blower will be discharged from the bag through the screen 67, the latter retaining the feathers in the bag.

The flexible connection 65 may include a spring 89 which allows said connection to yield in the direction of its length and which serves to keep it taut.

The dusting chamber 2 is provided with a window 77 which is closed by a glass and through which the operation of dusting the feathers is visible.

While we have illustrated herein a selected embodiment of the invention we do not wish to be limited to the constructional features shown.

We claim:

1. An apparatus for cleaning and sterilizing feathers comprising a dusting chamber and a sterilizing chamber separated by a partition, said partition provided with an opening, a closure whereby said opening may be closed or opened, a single blower effective to dust the feathers and to discharge same through said opening into the sterilizing chamber and from the apparatus and having a suction inlet and a delivery outlet, means for connecting the delivery outlet either to the dusting chamber for dusting operations or to a bag supporting element for discharge of feathers, means by which feathers may be delivered to the suction inlet, and means connecting said inlet to the sterilizing chamber.

2. An apparatus for cleaning and dusting feathers comprising a dusting chamber, means for agitating the feathers therein to remove dust therefrom, a sterilizing chamber, means to steam and sterilize feathers therein, means providing a direct communication between the dusting chamber and the sterilizing chamber and a single blower having connections for delivering dust from the dusting chamber, for transferring a batch of feathers from the dusting chamber to the sterilizing chamber and subsequently transferring said batch of feathers from the sterilizing chamber to a container.

3. An apparatus for cleaning and sterilizing feathers, comprising a receiving chamber to receive a batch of feathers, a dusting chamber, a sterilizing chamber, means providing a direct communication between the dusting chamber and the sterilizing chamber dust-liberating means in the dusting chamber for liberating dust from the feathers, and a single blower having connections for transferring a batch of feathers from the receiving chamber to the dusting chamber, for removing liberated dust from the dusting chamber, and for transferring said batch of feathers from the dusting chamber to the sterilizing chamber.

4. An apparatus for cleaning and sterilizing feathers comprising a receiving chamber to receive a batch of feathers, a dusting chamber, a sterilizing chamber, dust-liberating means in the dusting chamber for liberating dust from the feathers, means providing a direct communication between the dusting chamber and the sterilizing chamber and a single blower having connections for transferring a batch of feathers from the receiving chamber to the dusting chamber, for removing liberated dust from the dusting chamber, for transferring said batch of feathers from the dusting chamber to the sterilizing chamber, and subsequently transferring said batch of feathers from the sterilizing chamber to a container.

5. An apparatus for cleaning and sterilizing feathers comprising a dusting chamber, a sterilizing chamber having an inlet opening communicating with the dusting chamber, said dusting chamber having a screened dust-discharging opening, a blower having its discharge outlet connected to the dusting chamber, means for agitating the feathers in the dusting chamber, a dust-delivery pipe communicating with the screened opening and leading to a dust-collecting bag and a closure for closing or opening the inlet opening of the sterilizing chamber, whereby when said opening is closed, the blower operates to discharge the dust which is liberated from the feathers into the dust-collecting bag through the screened opening while when the inlet opening to the sterilizing chamber is open, said blower blows the feathers from the dusting chamber into the sterilizing chamber.

6. An apparatus for cleaning feathers comprising a receiving chamber into which a batch of feathers may be deposited, a dusting chamber, a blower having its suction inlet connected to the receiving chamber and its discharge to the dusting chamber, said dusting chamber having a screened dust-discharging opening, a dust-delivery pipe communicating with said opening and leading to a dust-collecting bag, means for agitating feathers in the dusting chamber, whereby said blower operates to transfer feathers from the receiving chamber to the dusting chamber and to convey the dust from the dusting chamber into the dust-collecting bag.

FRANK I. KLAYMAN.
FREDERICK R. LAWRENCE.